US007542946B2

(12) United States Patent
MacRae et al.

(10) Patent No.: US 7,542,946 B2
(45) Date of Patent: Jun. 2, 2009

(54) METHOD FOR ACCELERATED RETROFIT CERTIFICATION

(75) Inventors: Barbara MacRae, Seattle, WA (US); Wade T. Price, Redmond, WA (US); Raymond Roeder, Everett, WA (US)

(73) Assignee: The Boeing Company, Chicago, IL (US)

( * ) Notice: Subject to any disclaimer, the term of this patent is extended or adjusted under 35 U.S.C. 154(b) by 1398 days.

(21) Appl. No.: 09/976,403

(22) Filed: Oct. 11, 2001

(65) Prior Publication Data

US 2003/0074242 A1 Apr. 17, 2003

(51) Int. Cl.
*G06F 17/00* (2006.01)

(52) U.S. Cl. .................................................... 705/400

(58) Field of Classification Search ............. 705/35–40
See application file for complete search history.

(56) References Cited

U.S. PATENT DOCUMENTS 4,404,639 A * 9/1983 McGuire et al. .............. 701/35
4,887,206 A * 12/1989 Natarajan .................... 705/29
5,161,158 A * 11/1992 Chakravarty et al. .......... 714/26
5,189,606 A 2/1993 Burns et al. ................. 364/401
5,249,120 A * 9/1993 Foley ........................... 705/1
5,432,904 A * 7/1995 Wong ........................... 705/4
5,544,842 A * 8/1996 Smith et al. ................. 244/1 R
5,793,632 A * 8/1998 Fad et al. .................... 705/400
5,960,417 A * 9/1999 Pan et al. .................... 705/400
5,999,911 A 12/1999 Berg et al. ..................... 705/9
6,002,396 A 12/1999 Davies ....................... 345/339
6,016,477 A 1/2000 Ehnebuske et al. ............. 705/7
6,161,101 A 12/2000 Guinta et al. ................. 706/45
6,292,806 B1 * 9/2001 Sandifer .................. 707/104.1
6,820,038 B1 * 11/2004 Wetzer et al. .............. 702/184

* cited by examiner

*Primary Examiner*—Hani Kazimi
*Assistant Examiner*—Olabode Akintola

(57) ABSTRACT

A system, method, and computer program product are provided for estimating man-hours and costs to complete a certification of a modification to a system. The method includes entering one or more components that require certification activity based on the modification. Other components that require certification activity because they are affected by the entered one or more components are automatically identifying based on the entered one or more components. The scope of work needed to complete certification for each entered and identified component is identified. The method then determines if the entered and identified components and the associated scopes of work apply to the modification, and generates an estimate of man-hours and costs needed to complete certification based on all of the determined scopes of work.

37 Claims, 15 Drawing Sheets

350

Certification Quote Summary

| | | | |
|---|---|---|---|
| Date: | 8/6/2001 | | |
| Proposal #: | **4767** | Status: **In Work** | Start Date: 4/15/01 |
| Estimator: | **Cruz, Lisa A** | | End Date: 4/15/02 |
| Proposal Description: | **Hawaiian Airlines 767 Interior Mod** | | |
| Change (Major/Minor): | Major | | |
| Airplane Specifics: | 767-300 | | |
| Certification Approach(s): | Service Bulletin, Supplemental Type Certificate, Foreign Certification | | |
| **Total (Cost) Man Hours*:** | **824** | **Total Foreign regulatory fees: $12000** | |
| DER Types: | Cargo Systems, Comm/Ant, ECS, Electrical, EMC/EMI, Escape Sys, Fire Contain, Flammability, Flight Manual, Interiors, Materials, Mechanisms, Oxygen Sys, PA/Entertain, Software, Stress, Structures, Water/Waste, Weights & Balance | | |

FIG. 15

METHOD FOR ACCELERATED RETROFIT CERTIFICATION

FIELD OF THE INVENTION

This invention relates generally to system certification and, more specifically, to a method for accelerating system certification.

BACKGROUND OF THE INVENTION

Projects for modifying current airplanes or other complex systems rely on the experiences of many skilled individuals to ensure certification of the project is complete. In addition, many labor-hours and up to two months of time may be required to develop a comprehensive certification strategy, i.e. an understanding of all the complexities (costs, labor-hours, etc.) needed to complete the certification. When modification or retrofit projects are quoted to a client, such as an airline, a quotation for the modification or retrofit is often given before a comprehensive certification strategy has been developed. Therefore, costs and complexities of completing the certification for the modification or retrofit often are not understood and therefore may be overlooked in the cost proposal submitted to the client.

Therefore, a need exists for accelerating the process in which to generate a certification strategy.

SUMMARY OF THE INVENTION

A system, method, and computer program product for estimating man-hours and costs to complete a certification of a modification to a system are provided. By accelerating the estimating process a designer or project proposer quickly understands the costs and man-hours required to complete the certification process. In addition, the burden on engineering departments, qualified certification experts, and others currently requested to partake in the certification strategy development process is greatly reduced.

The method includes entering one or more components that require certification activity based on the modification. Other components that require certification activity because they are affected by the entered one or more components are automatically identified based on the entered one or more components. The scope of work needed to complete certification for each of the entered and identified components is identified. The method then determines if the entered and identified components and the associated scopes of work apply to the modification, and generates an estimate of man-hours and costs needed to complete certification based on all of the determined scopes of work.

BRIEF DESCRIPTION OF THE DRAWINGS

The preferred and alternative embodiments of the present invention are described in detail below with reference to the following drawings.

FIG. 15 is an example of an outputted report produced by operation of the screen shots illustrated in FIGS. 4-14.

DETAILED DESCRIPTION OF THE INVENTION

The present invention provides a tool for estimating the scope of work and costs required for a certification process required for a modification or retrofit of an existing complex system. The present invention greatly accelerates the process of developing a certification strategy. Examples of complex systems are airplanes, motor vehicles, satellite systems, or any other device that requires satisfying certification requirements on components (commodities), wherein modification of some components will affect certification requirements on other components.

Figure 1:
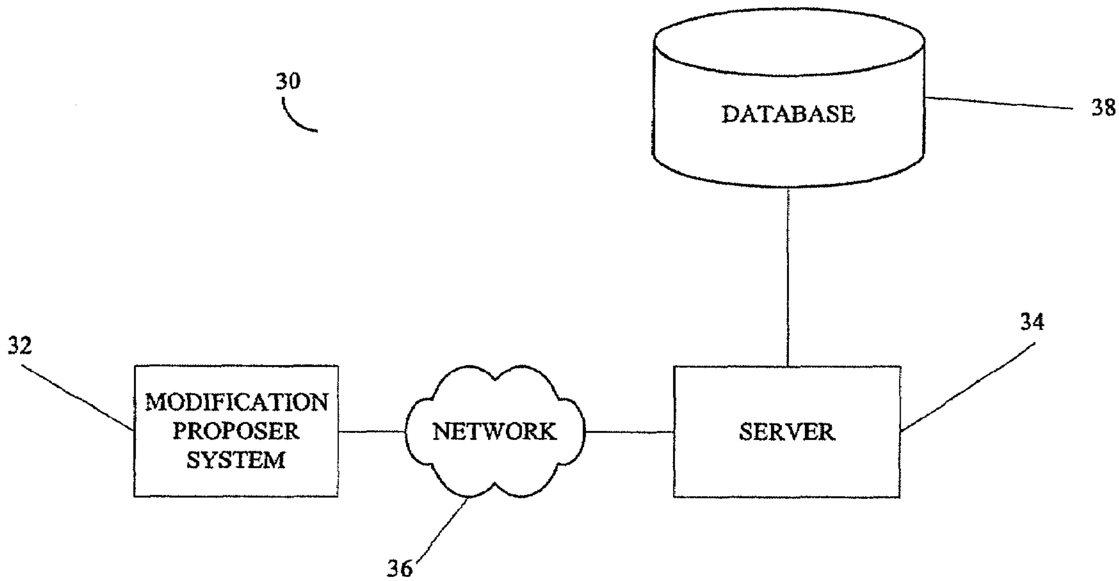
FIG. 1 is a block diagram of an example system for performing the process of the present invention.

FIG. 1 illustrates an example system 30 used in implementing the present invention. The system 30 includes one or more modification proposer systems 32 coupled to a server 34 over a network 36. The proposer system 32 and the server 34 are preferably processor-based systems. The network 36 is one of a public or private data network. Connected to the server 34 is a database 38 that includes information about how components relate to other components based on a complex system model type, queries relating to the components, certification methods and regulations, and the relationship of the methods and regulations to the components. For example, a complex vehicle such as an airplane includes numerous components located in any given section of the airplane. When modifying or retrofitting a component located in a certain area of the airplane, certification requirements of other components may be affected. In this example, the server 34 executes an application program that generates an interactive web-based tool. An example of such a tool is shown in FIGS. 4-14 below. The tool is accessed by a user at the modification proposer system 32 over the network 36. In an alternate embodiment, the application program is executed directly on the proposer system 32.

Because a user, e.g. design engineer, literally does not understand what components will effect other components in areas in which the user does not work, there exists a condition where affected components may be initially ignored when trying to estimate the cost in completing a certification process. The design engineer typically queries a designated engineering representative (DER) who has experience with and knowledge of specific components and their associated government regulations that must be adhered to in order to pass the certification process. The DER also has government authority, to certify the component they are given authority over. For example, in the U.S. the authority comes from the Federal Aviation Administration (FAA). The database 38 includes information regarding how specific government regulations relate to specific components. This is knowledge that the DERs possess. Through their experience, DERs develop and posses an understanding of component and regulatory inter-dependencies. This DER understanding is included in the database 38. By maintaining this information in an easily accessible location, the process of generating a certification strategy is greatly accelerated.

Figure 2:
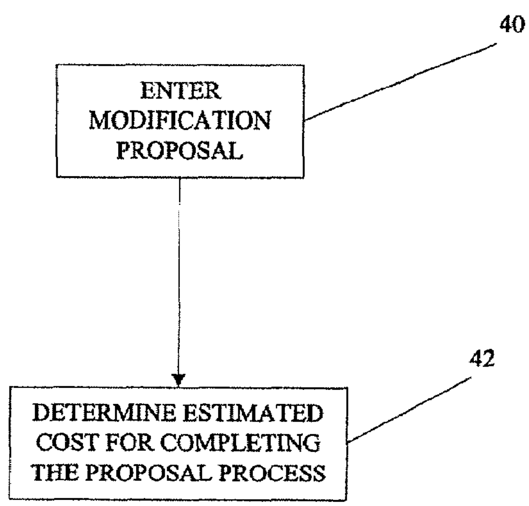
FIGS. 2 and 3 are flow diagrams illustrating the process performed by the system shown in FIG. 1.

FIG. 2 illustrates a process performed by the system 30 shown in FIG. 1. First, at block 40, a design engineer or other designated person enters information relating to a modification project as prompted by the application program resident on the server 34 and viewed as a page, such as HTML pages, on the proposer system 32. Next, at block 42, the application program determines the estimated costs and man-hours for completing a certification of the entered modification proposal. The process is described in more detail below with respect to FIG. 3.

Figure 3:
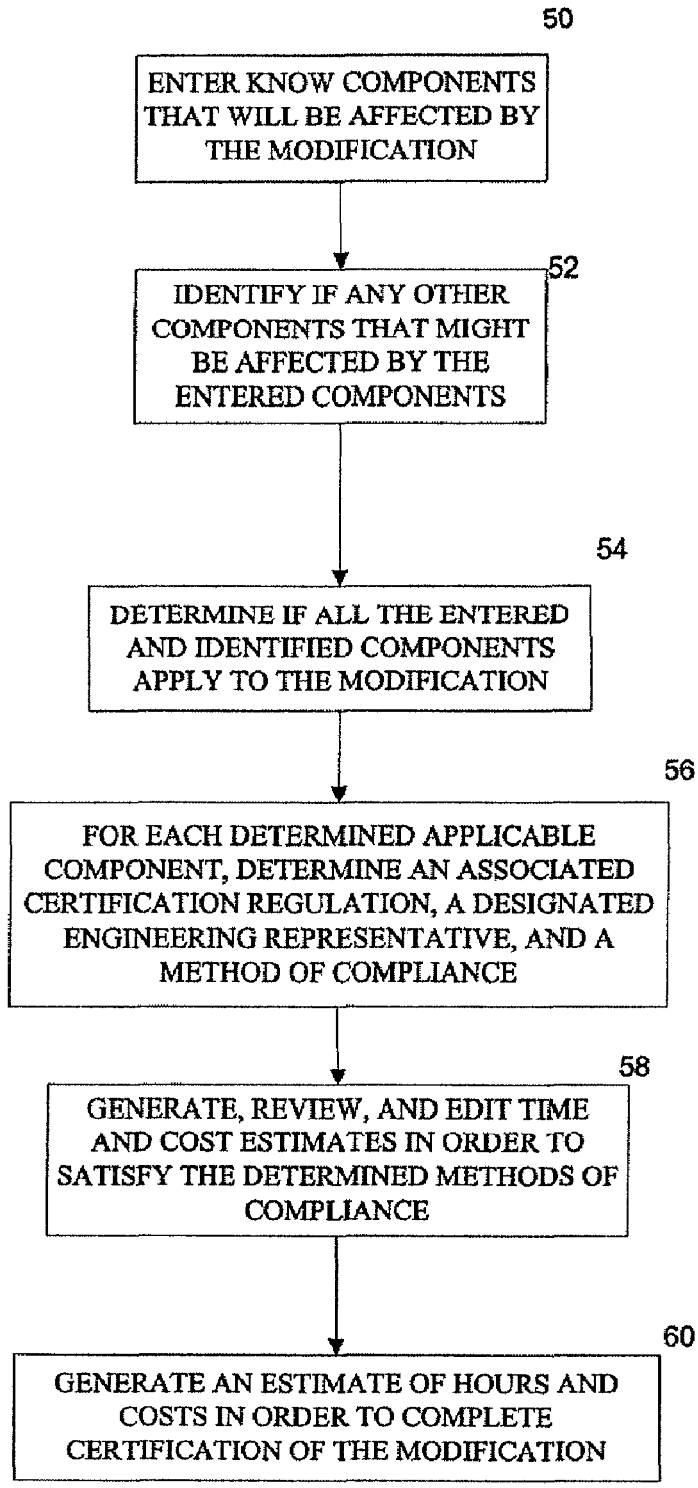

FIG. 3 illustrates in more detail the process performed by the application program resident on the server 34 as described in FIG. 2. First, at block 50, the user (e.g., design engineer) enters known components that will be affected by a desired modification project. Next, at block 52, the application program automatically identifies any other components that might be affected by the entered components based on the information stored in the database 38. At block 54, the user determines if the entered and identified components apply to the modification. In one embodiment, the application program provides an interactive query that helps the user determine applicability of entered and identified components. Then, at block 56, the application program, using the stored information, determines any associated certification regulations or requirements, a designated engineering representative(s), and a method of compliance for each determined applicable component. At block 58, the application program generates time estimates in order to satisfy the determined methods of compliance and the user reviews and edits the generated time estimates, if desired. Finally, at block 60, the application program generates a man-hour and cost estimate needed for completing the certification process for the modification project. This process can take less than a day, thereby allowing the person performing the modification to quickly access certification costs and include these costs when giving a bid for a modification project.

Figure 4:
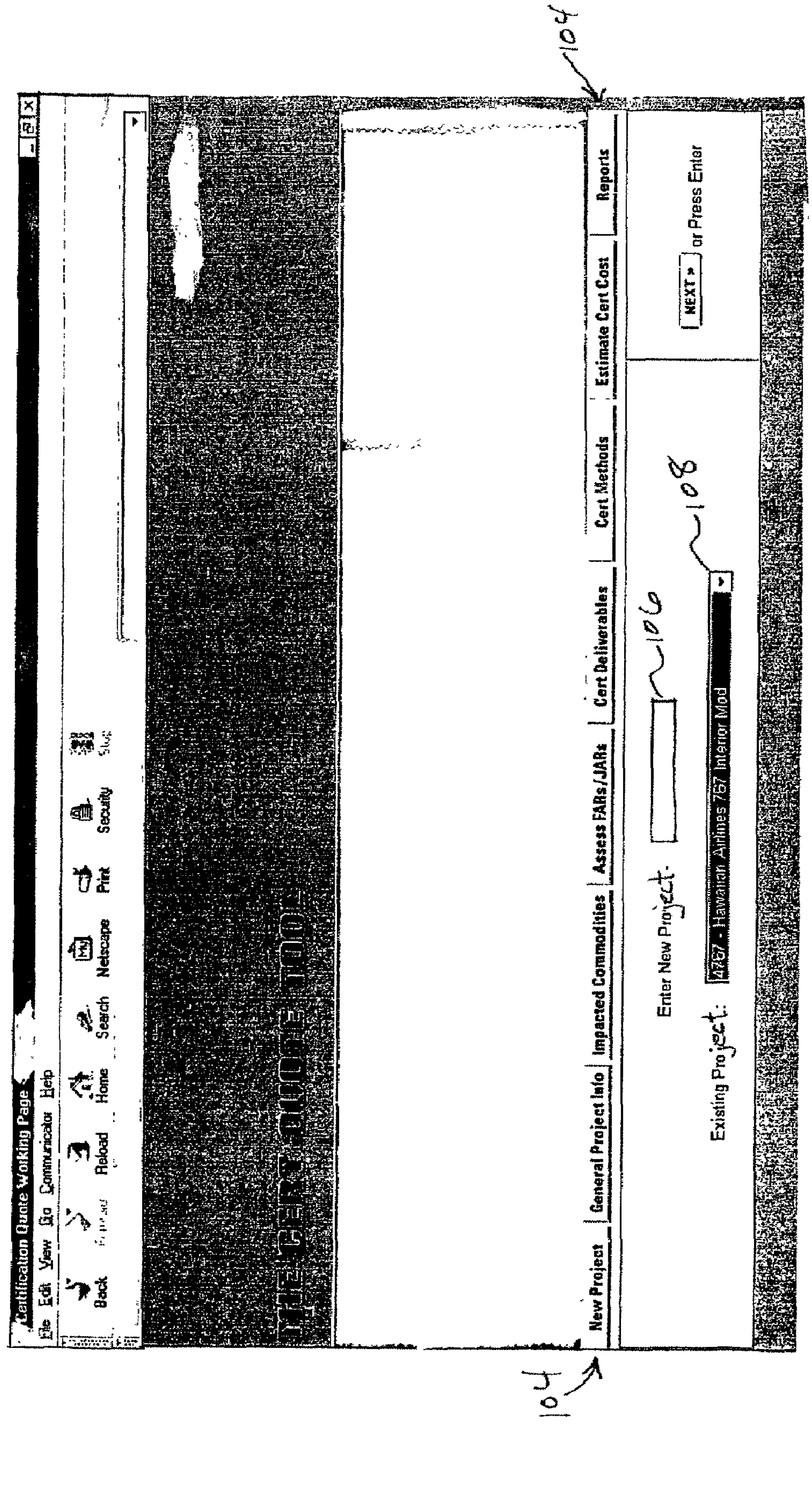
FIGS. 4-14 are screen shots of an example network interface tool that performs the process illustrated in FIGS. 2 and 3.

Given by way of a non-limiting example, FIGS. 4-14 illustrate pages (web-based tool) generated by the application program at the server 34. FIG. 4 illustrates an initial entry page that allows the user to identify a new proposal/project in field block 106 or to access a preexisting stored project as identified in a pull down menu 108. This web-based tool includes a series of pages that are accessed by activation of execution buttons on a presently displayed page, or by selecting one of a number of associated tabs or buttons 104.

Figure 5A:
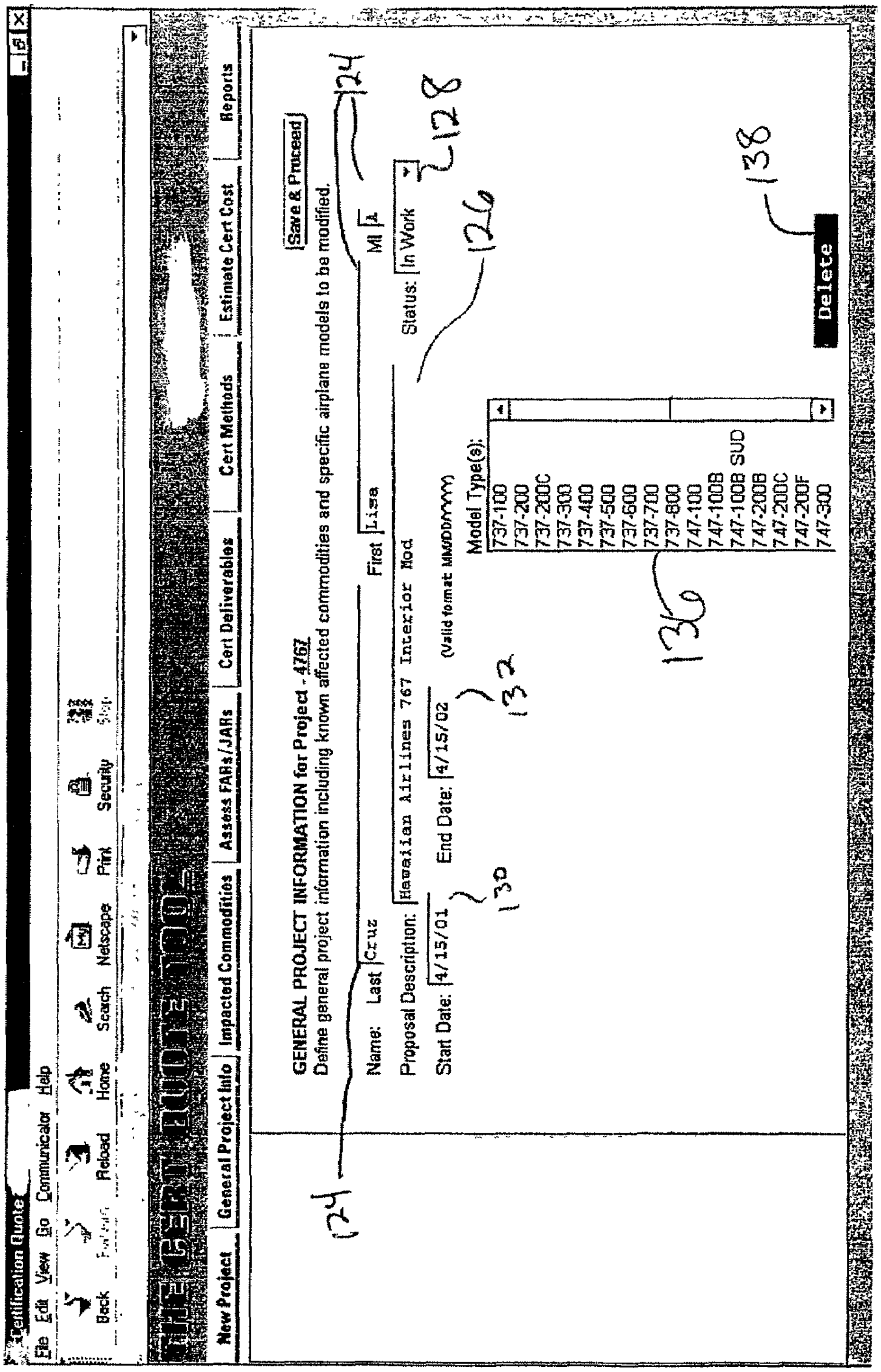

FIG. 5A illustrates a general project information page that allows the user to enter the user's name in name field blocks 124, a description of the project for modification in field block 126, and the start and end date in field blocks 130 and 132. The user also selects a status of the modification from a scroll down menu of selections window 128. In a scroll down aircraft model types menu of selections window 136, the user identifies which aircraft model types apply to the modification project. In this example, aircraft model type selection is performed by highlighting model types. A delete key 138 is used to clear all entries in the window 136 that have been highlighted. However, it will be appreciated that other selection methods may be used as well. For example, in another embodiment a desired model may be highlighted and an "add" key (not shown) may be activated.

Figure 5B:
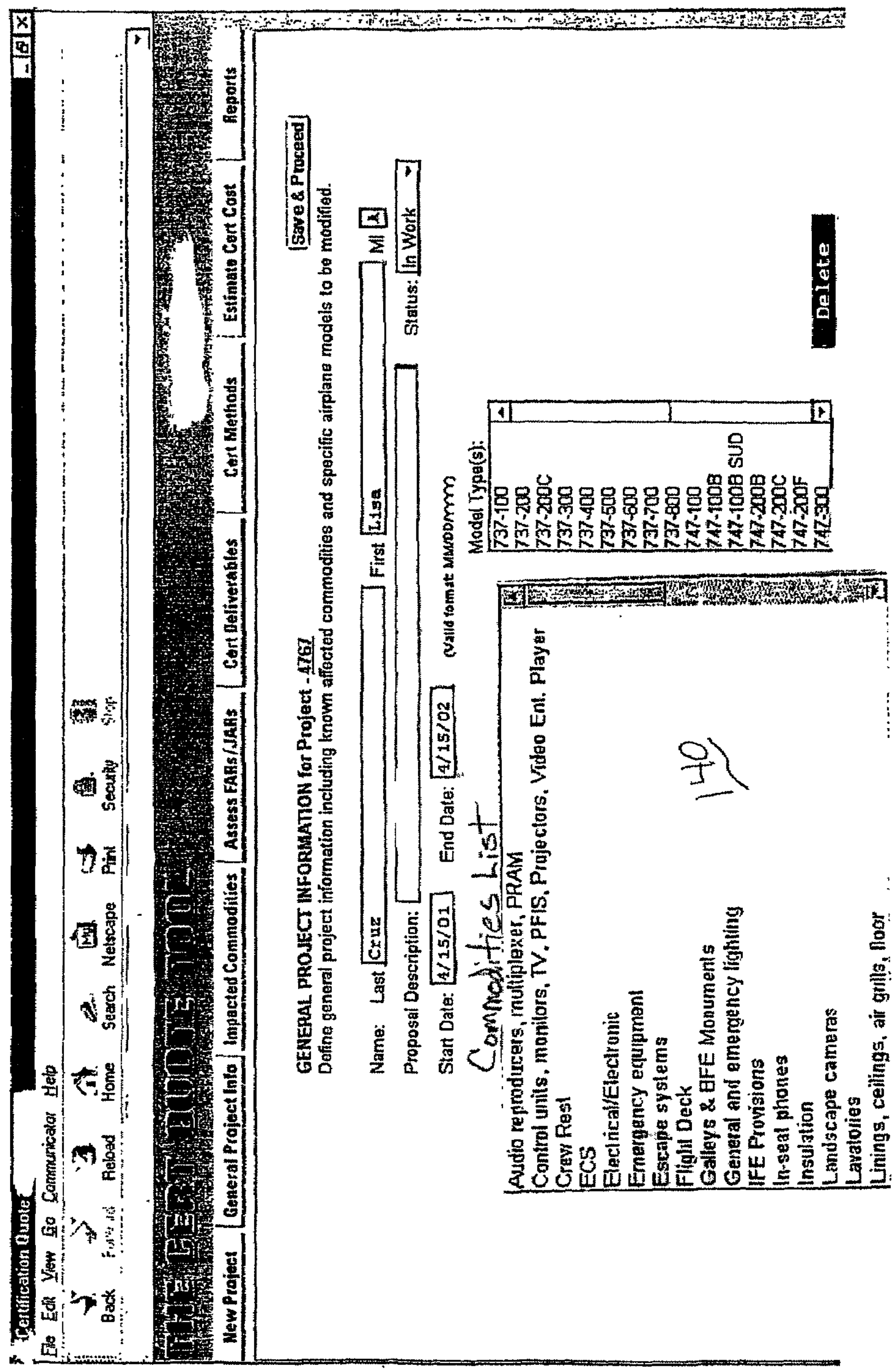

FIG. 5B illustrates a general project information page that is presented if the user enters a new project into field block 106 as shown in FIG. 4. In a new project, the user has not selected any components/commodities certification affected by the modification project. Therefore, a commodities list 140 is presented to the user. The commodities list 140 is preferably a scroll down list that allows the user to select from a preset list of commodities.

Figure 6:
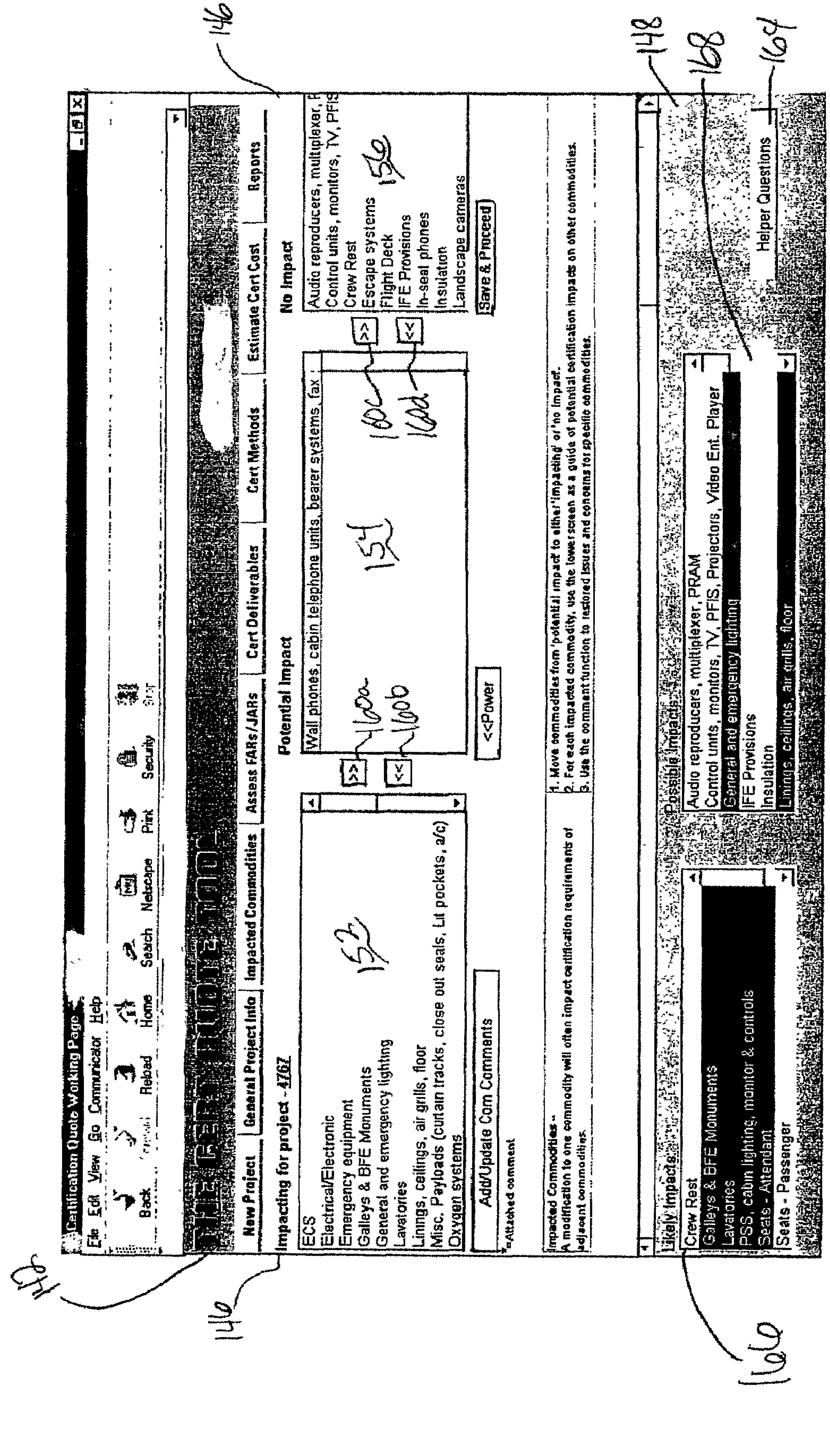

FIG. 6 illustrates an impacted commodities page 142. The impacted commodities page 142 includes a commodity selection/deselection section 146 and a user aid section 148. The commodity selection/deselection section 146 includes a scroll down impacted commodities window 152, a scroll down potential impacted commodities window 154, and a nonimpacted commodities scroll down window 156. The impacted commodities window 152 includes all the aircraft system commodities selected from the commodities list 140 as shown in FIG. 5B and those commodities determined to be impacted upon based on the information in the database 38. In between each of the scroll down windows are left and right arrow buttons 160*a*-160*d* that allow the user to move identified commodities from one adjacent scroll down window to the other adjacent window in the direction the arrow is pointing. For example, if the user decides that the commodity electrical/electronic does not apply to the project and is presently shown in the impacted commodities window 152, the user highlights electrical/electronic in the impacted commodities window 152 by activating a cursor over this commodity and then selects the right arrow button 160*a*. The electrical/electronic commodity then moves to the potential impact window 154. The commodities that are listed in the impacted and potentially impacted commodities windows 152 and 154 include at least those commodities that were previously selected in the commodities list 140, but also include other commodities that may be affected as determined by the application program and information stored in the database 38 that identifies any other impacted systems. A commodity is affected if a certification activity must occur for it. The purpose of page 142 is to get the user to positively remove any potentially impacted commodities that were determined to be potential impacts by the system/application program. The user must either move the potentially impacted commodities to the impacted commodities window 152 or to the nonimpacted commodities window 156.

Figure 7:
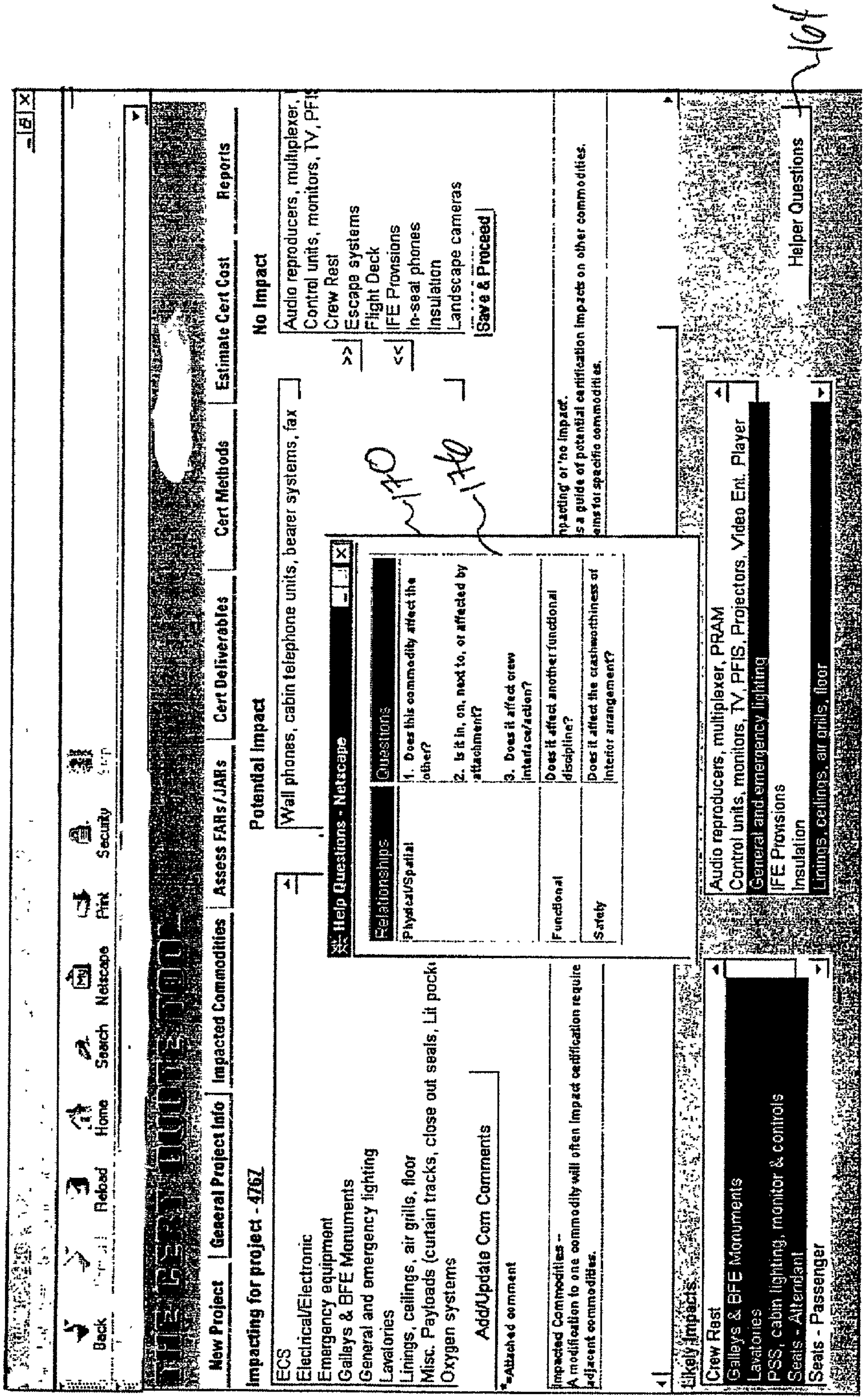

Section 148 includes a likely impacted commodities scroll down window 166 and a possible impacted commodities scroll down window 168. In order to help the user to determine whether any of the items listed in section 146 have any impact on the entered project, in section 148 the user selects a query that relates to an item activated by the user using an interface device, such as a cursor control device. Then, the user activates a helper question button 164 that causes the application program to present a helper question window 170, see FIG. 7. Referring now to FIG. 7, the helper question window 170 includes a questions table 176 with questions relating to at least one of a number of impacted or affected relationship categories, such as physical/spatial relationship, function relationship, or safety relationship. The purpose of the helper question window 170 is to prompt the user to consider comprehensive relationships in the accelerated estimating environment of this invention.

Figure 8:
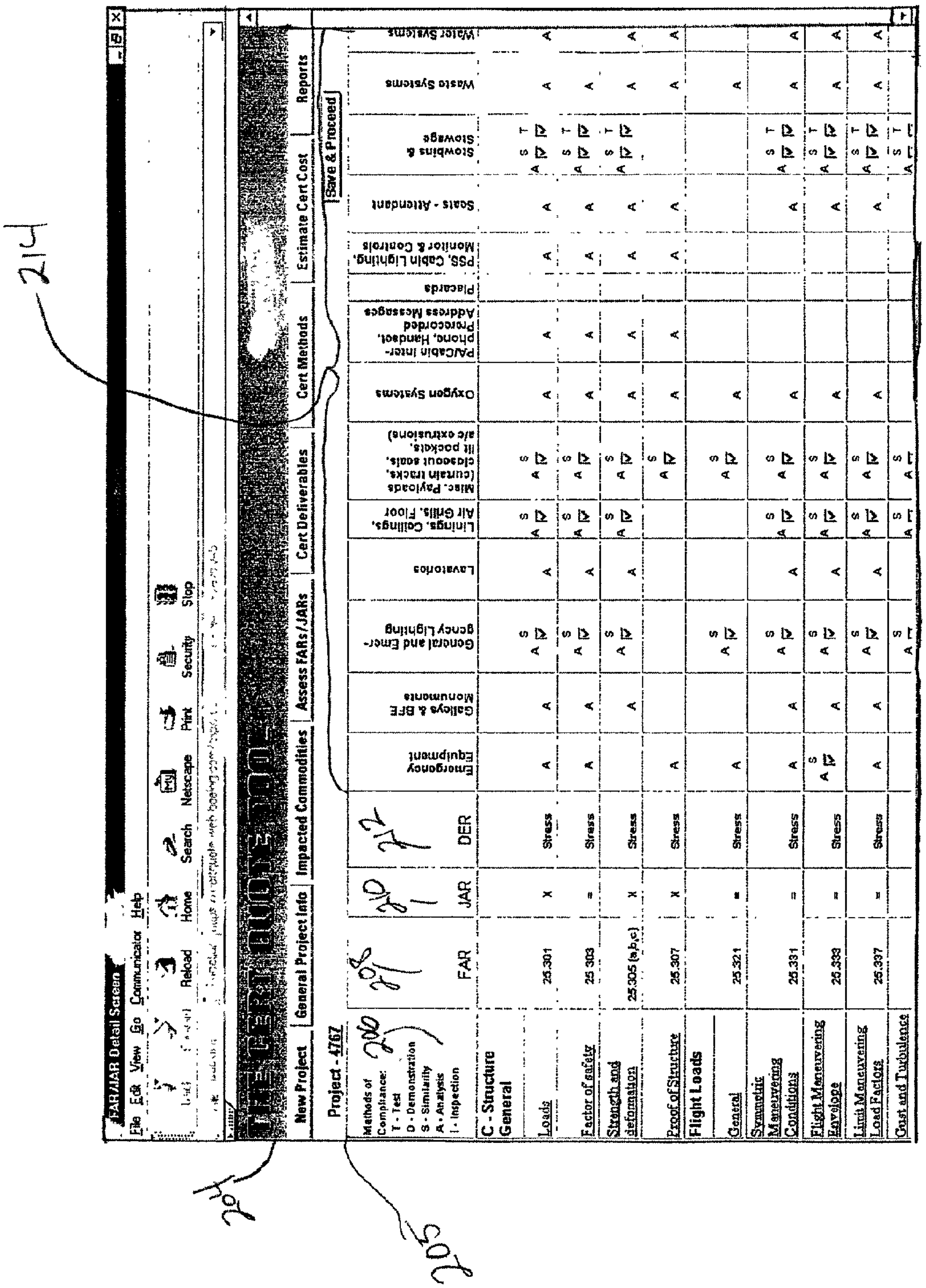

Referring now to FIG. 8, after the user has satisfied the requirements of page 142, the user is presented with a regulations detail screen 204. The regulations detail page 204 includes a table 205 that includes regulation titles in a left column 206. In this example the regulation titles are from the Federal Aviation Regulations (FAR), that are affected at least in part by one or more of the commodities listed in the impacted commodities window 152. A second column 208 and a third column 210 indicate various regulations and requirements, such as the actual FAR number and how the Joint Aviation Requirements (JAR), a European regulatory system, correspond to the identified FAR title. A designated engineering representative (DER) column 212 identifies the physical DER group or the actual DER assigned to that FAR title. The following columns 214 indicate each of the items presented in the completed impacted commodities list window 152 and identify a method of compliance for completing certification on the specific item to comply with the FAR identified in column 208 in the same row. The types of methods of compliance available in this example are testing, demonstrating, simulating, analysis, and inspection. However, other compliance methods may apply depending upon the needs of the project certification.

Figure 9:
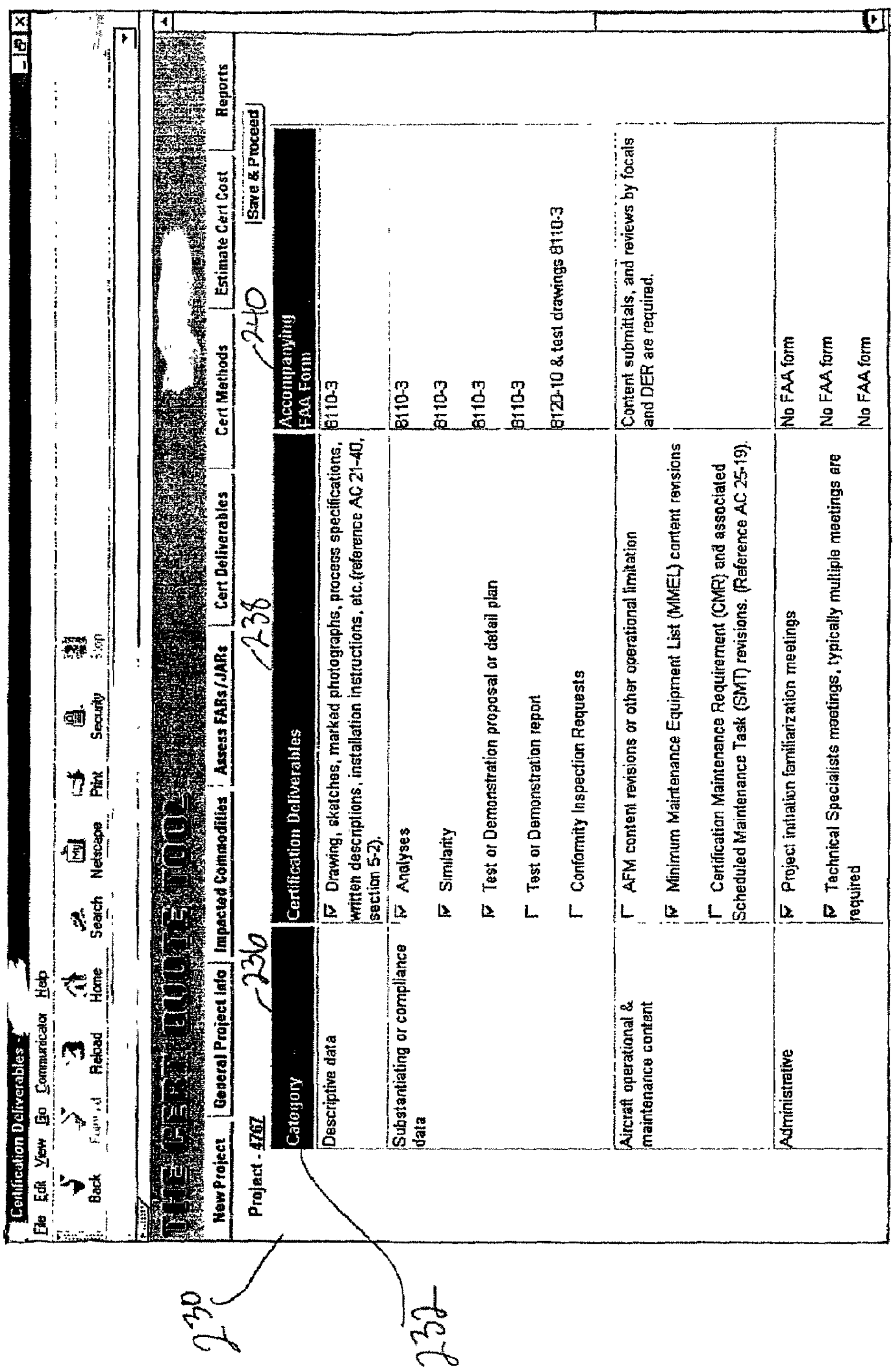

FIG. 9 illustrates a certification deliverables page 230. The certification deliverables page 230 includes a table 232 that includes a category column 236 that identifies a category of deliverables. The table 232 also includes in column 238 the certification deliverables that are associated with the presented category titles. A third column 240 includes any FAA form required for certification of or accompaniment with the deliverable identified in column 238.

Figure 10:
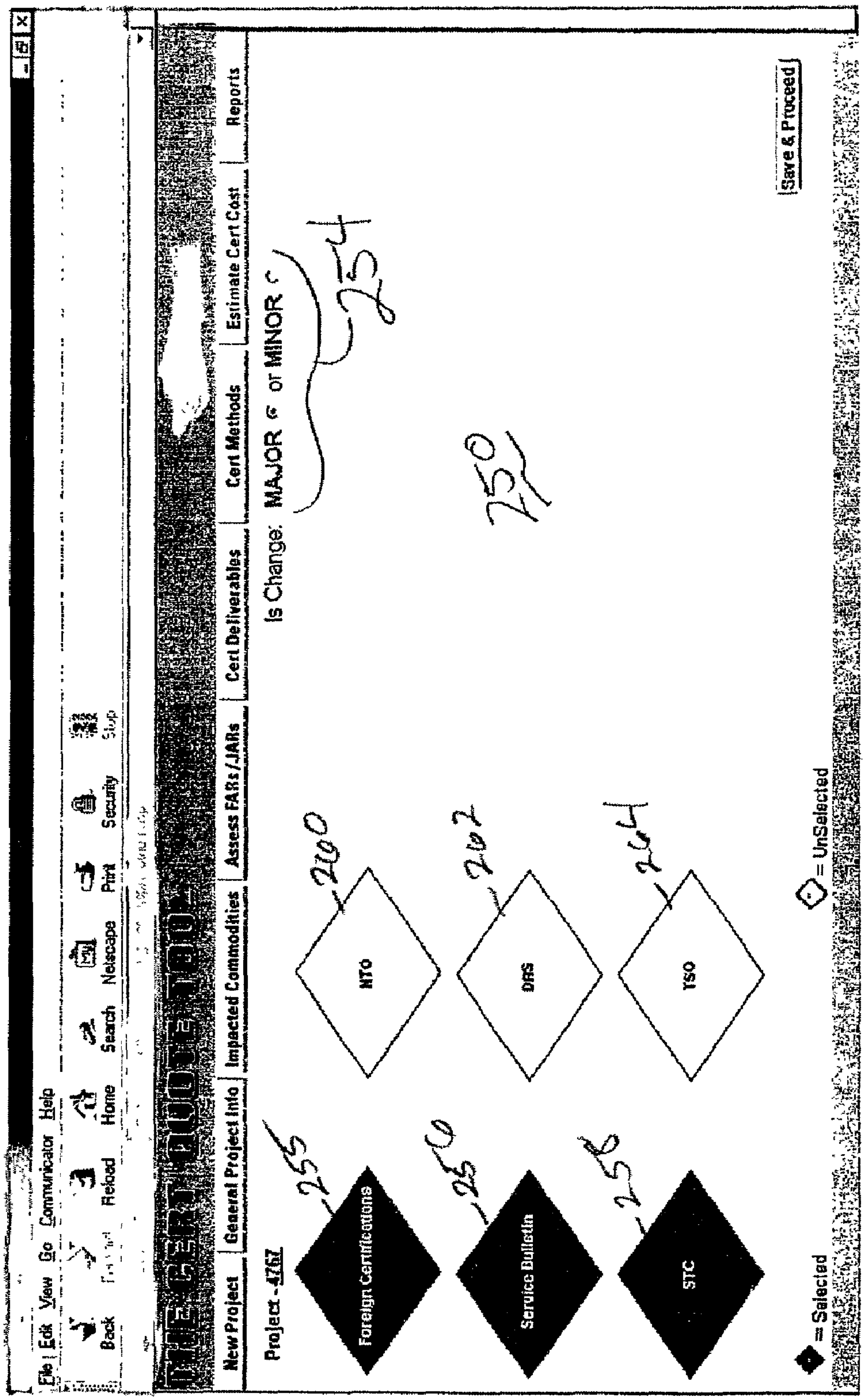

FIG. 10 illustrates a certification methods identifier page 250. The certification methods identifier page 250 allows the user to select whether the modification is a major or a minor modification as identified by selectors 254 and allows the user to view what scope of work is required under various method topics. The various method topics are listed icons 255-264. The icons include a foreign certifications icon 255, a service bulletin icon 256, a supplemental type certification (STC) icon 258, a no tech objection (NTO) icon 260, a designated alteration stations (DAS) icon 262, and a technical standard order (TSO) icon 264. When the user moves a cursor over one of these icons 255-264, the user is presented (e.g. pop-up window) with information related to the associated icon. As shown in page 250, only the foreign certifications icon 255, service bulletin icon 256, and STC icon 258 are highlighted, thereby indicating that the application program has determined that these are methods and/or costs associated with the icon required to be performed in order to complete the certification process based on the previously entered information. A non-highlighted icon indicates that there were no associated costs or methods required to be paid or performed for the certification process of the project.

Figure 11:
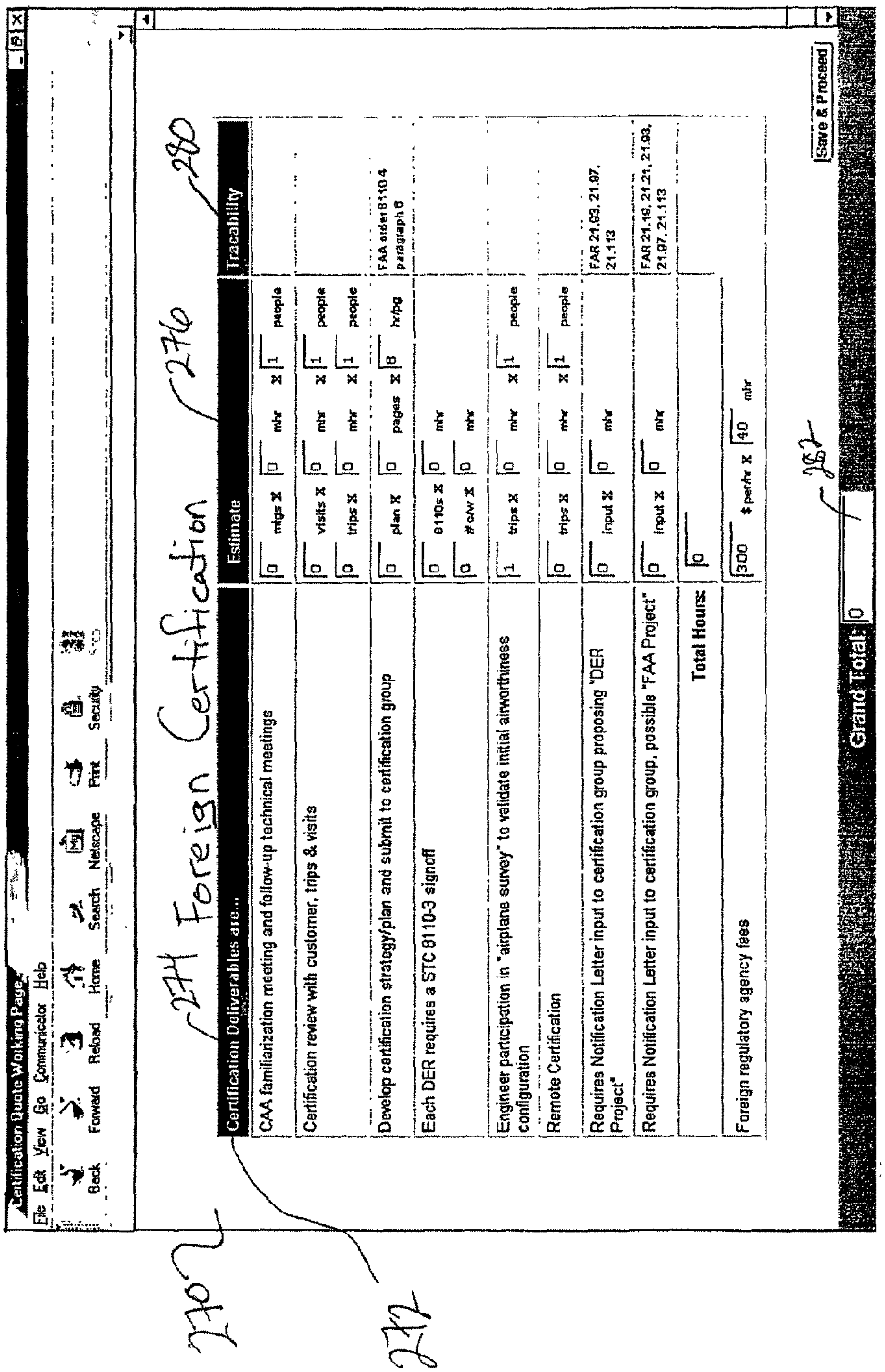
Figure 12:
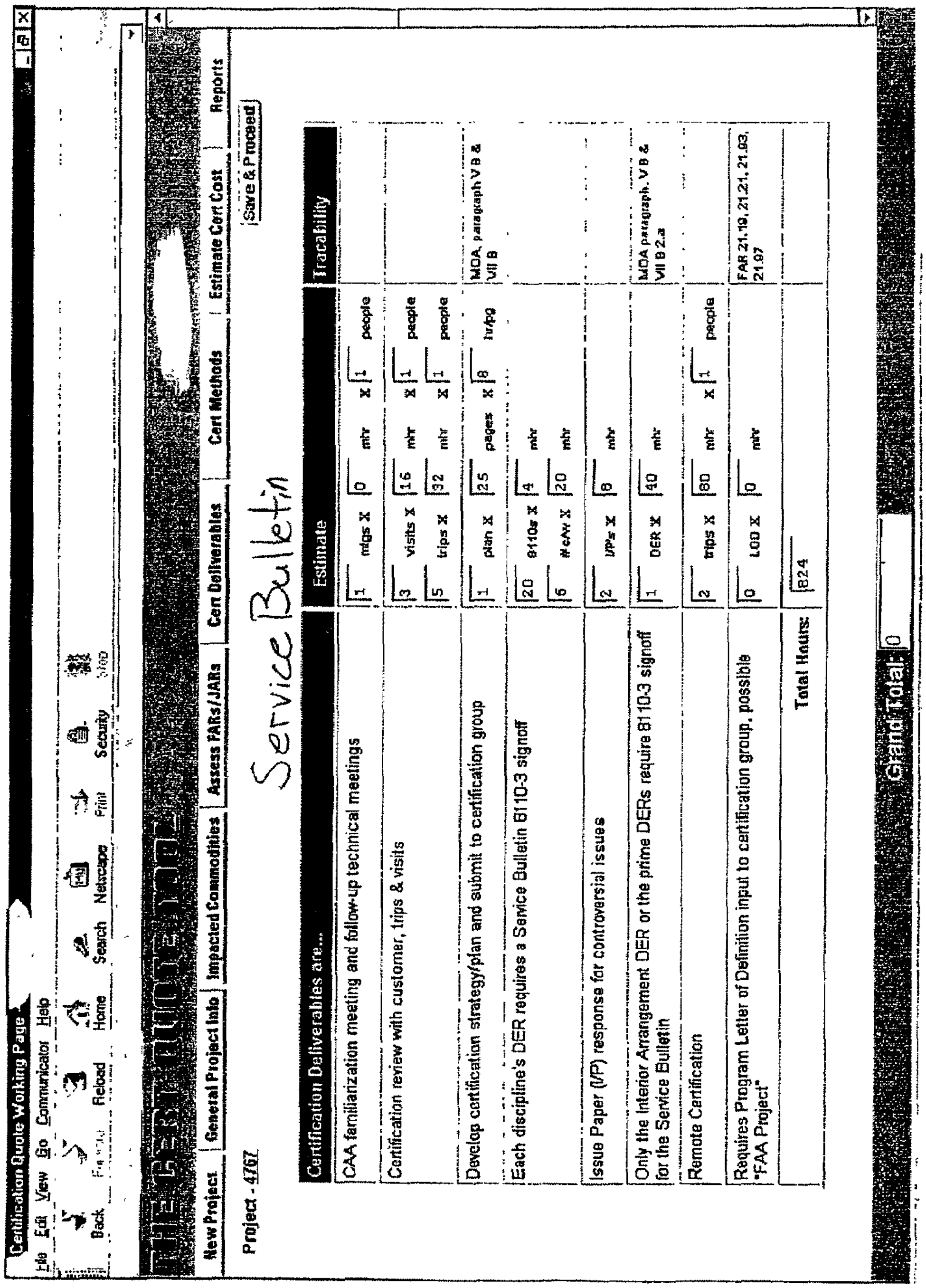
Figure 13:
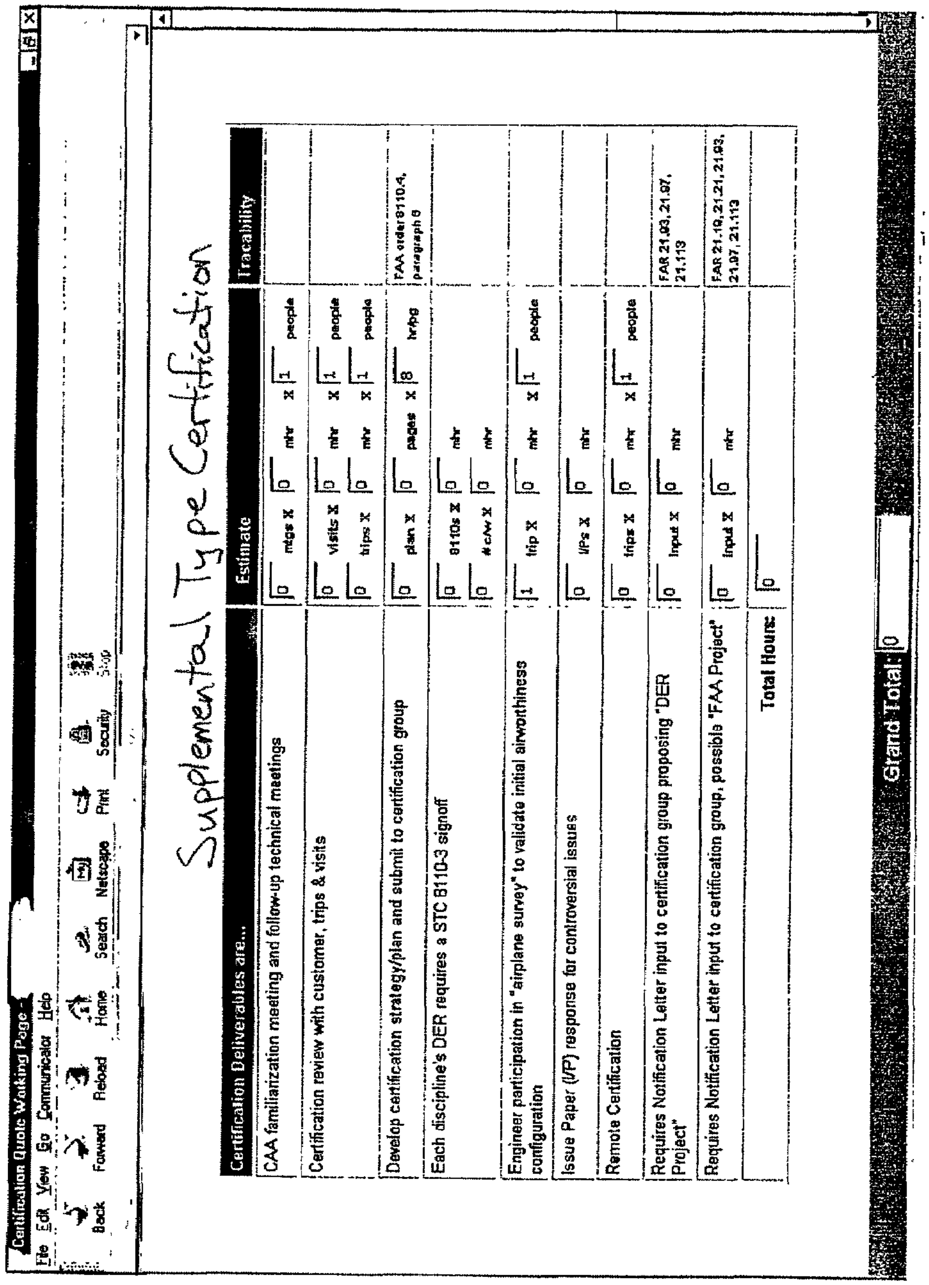

FIG. 11 illustrates a page 270 that includes a foreign certification methods table that is presented upon selection of the foreign certifications icon 255 as shown in FIG. 10. The foreign certification methods table 272 includes a first column 274 that shows certification deliverable titles, a second column 276 that shows man-hour and cost estimates related to each of the deliverables included in the first column 274, and a third column 280 that shows tracability or related FAA documents and FAR or JAR requirements. The second column 276 includes blocks that allow the user to enter various information, such as number of meetings, visits, trips, number of people required to complete these meetings, and number of man-hours associated with each. Other items included in the second column 276 are number of inputs and number of forms required for completion of the associated certification deliverables. Also included in the table 272 is an estimate of foreign regulatory agency fees with an adjustable hourly rate and number of man-hours associated therewith. At the bottom of the page 270 is a grand total window 282 that shows the number of man-hours as calculated by an algorithm in the application program using the numbers that were entered in the second column 276. FIG. 12 presents a page similar to page 270 that is presented upon activation of the service bulletin icon 256 as shown in FIG. 10. FIG. 13 presents a supplemental type certification table when the STC icon 258 is selected from FIG. 10.

Figure 14:
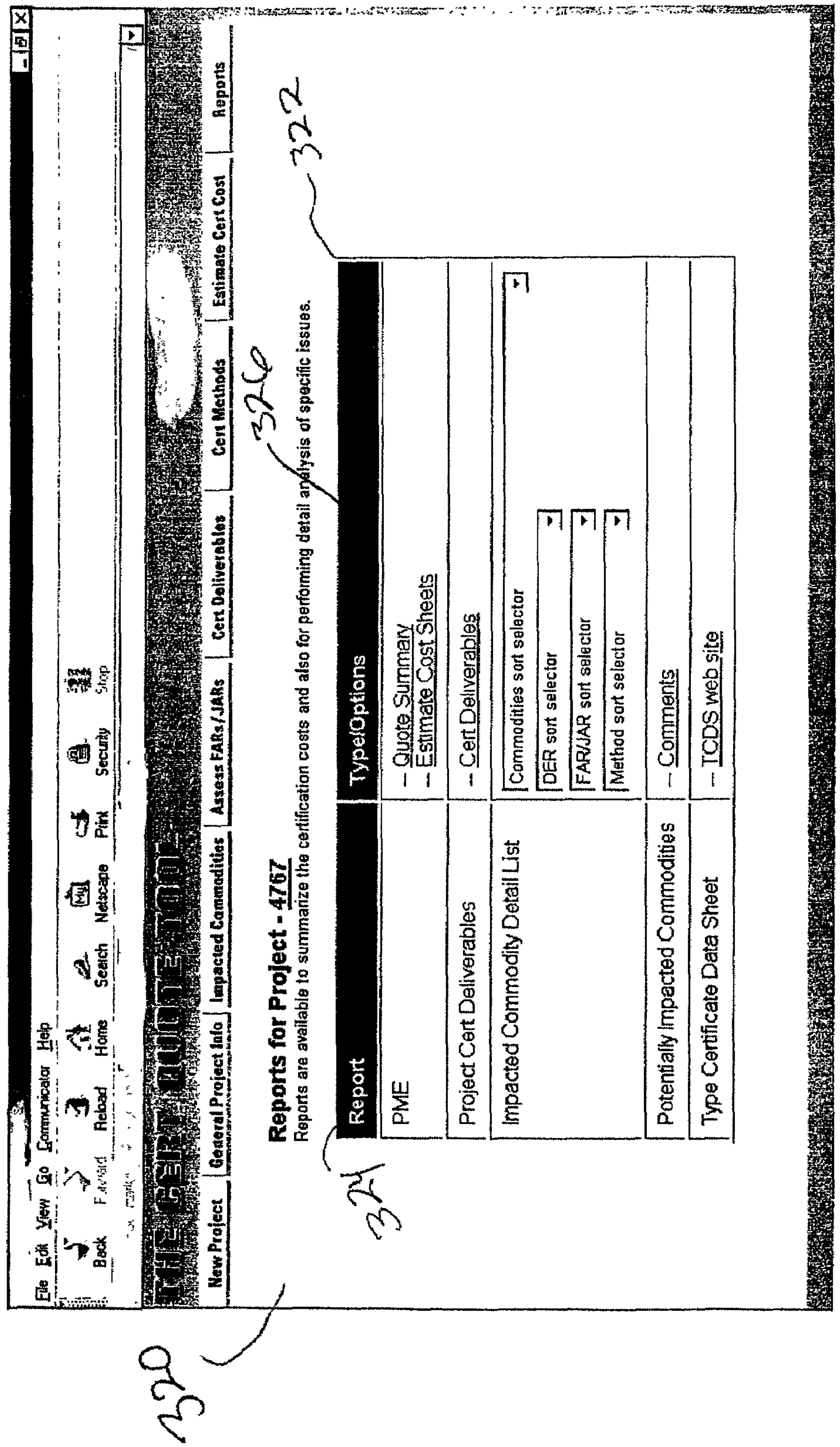

Once all of the method tables shown in FIGS. 11-13 have been completed, the user can generate various reports from a reports page 320 as shown in FIG. 14. The reports page 320 includes a table 322 that includes a first column 324 that lists broad titles of reports and a second column 326 that includes specific types and options of reports, some of which are adjustable by the user. The user has the ability to select from various other reports, such as estimate cost sheets, certification deliverables, impacted commodities, associated DERs, associated FAR/JARs, methods for completing commodity requirements, any associated comments, and type certification data sheet. Other reports can be implemented into the system provided a link is inserted to retrieve the desired document or report.

FIG. 15 illustrates a certification quote summary 350 printed from selection of a link from the reports table 322. The certification quote summary 350 is a summary of the information included in each of the method tables shown in FIGS. 12-14. The quote summary 350 presents a quick report of some of the costs and man-hours required to complete certification of the entered modification.

In an alternate embodiment, a partial subset of information from the database 38 is implemented in a hard copy document for distribution to users (design engineers). In this embodiment, the user receives training on how to use the distributed hard copy document. By using the hard copy document the user can quickly identify if any components to be modified affect other components that would require certification activity.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A computer-implemented method for estimating man-hours and costs to complete regulatory certification of a modification to a system, the method comprising:

entering one or more components of the system involved in the modification in a computing device;

based on the entered one or more components of the system, automatically identifying other components of the system that may be involved in the modification;

determining which of the automatically identified other components of the system to include in the modification;

identifying which of the entered components and the included other components involved in the modification require regulatory certification activity based on the modification;

determining at least one scope of work needed to complete regulatory certification for each of the entered and included other components;

wherein determining the other components to include in the modification, identifying which of the entered components and the included other components that require regulatory certification, and determining at least one scope of work further comprises:

answering questions to prompt a user to consider at least one comprehensive relationship between the entered components and the included other components; and generating an estimate of man-hours and costs needed to complete regulatory certification based on all of the determined scopes of work.

2. The method of claim 1, wherein each scope of work comprises one or more methods of compliance to be performed in order to satisfy one or more government regulations associated with the component, and wherein the estimate includes estimated man-hours and costs for performing the one or more methods of compliance.

3. The method of claim 2, wherein the one or more methods comprises at least one of testing, demonstrating, simulating, analyzing, or inspecting.

4. The method of claim 2, wherein the government regulations are one of federal aviation regulation or joint aviation requirement.

5. The method of claim 1, wherein determining comprises supplying queries to a user, wherein the queries relate to applicability of an associated component.

6. The method of claim 5, wherein the queries are at least one of a physical, spatial, functional, or safety query.

7. The method of claim 1, wherein the system is an aircraft, wherein entering comprises entering aircraft model type affected by the modification, and wherein identifying is further based on the entered aircraft model type.

8. The method of claim 1, further comprising identifying any certification deliverables based on the determined applicable components and associated scopes of work.

9. The method of claim 8, wherein identifying further comprises identifying government forms associated with the identified deliverables.

10. A computer-based apparatus for estimating man-hours and costs to complete regulatory certification of a modification to a system, the apparatus comprising:

means for entering one or more components of the system involved in the modification;

means for automatically identifying other components of the system that may be involved in the modification based on the entered one or more components;

means for determining which of the automatically identified other components of the system to include in the modification;

means for identifying which of the entered components and the included other components involved in the modification require regulatory certification activity based on the modification;

means for determining at least one scope of work needed to complete certification for each of the entered and included other components;

wherein the means for determining the other components to include in the modification, the means for identifying which of the entered components and the included other components that require regulatory certification, and the means for determining at least one scope of work further comprises:

means for answering questions to prompt a user to consider at least one comprehensive relationship between the entered components and the included other components; and means for generating an estimate of man-hours and costs needed to complete regulatory certification based on all of the determined scopes of work.

11. The apparatus of claim 10, wherein each scope of work comprises one or more methods to be performed in order to satisfy one or more government regulations associated with the component, and wherein the estimate includes estimated man-hours and costs for performing the one or more methods of compliance.

12. The apparatus of claim 11, wherein the one or more methods comprises at least one of testing, demonstrating, simulating, analyzing, or inspecting.

13. The apparatus of claim 11, wherein the government regulations are one of federal aviation regulation or joint aviation requirement.

14. The apparatus of claim 10, wherein determining comprises supplying queries to a user, wherein the queries relate to applicability of an associated component.

15. The apparatus of claim 14, wherein the queries are at least one of a physical, spatial, functional, or safety query.

16. The apparatus of claim 10, wherein the system is an aircraft, wherein the means for entering comprises a means for entering aircraft model type effected by the modification, and wherein the means for identifying identifies further based on the entered aircraft model type.

17. The apparatus of claim 10, further comprising a means for identifying any certification deliverables based on the determined applicable components and associated scopes of work.

18. The apparatus of claim 17, wherein the means for identifying any certification deliverables further comprises a means for identifying government forms associated with the identified deliverables.

19. A computer-readable storage medium having stored thereon computer-executable instructions for estimating man-hours and costs to complete regulatory certification of a modification to a system, said instructions when executed on a computer causes the computer to perform a method comprising the step of:

receiving entry of one or more components of the system involved in the modification;

automatically identifying other components of the system that may be involved in the modification based on the entered one or more components;

allowing a user to determine which of the automatically identified other components of the system to include in the modification;

identifying which of the entered components and the included other components involved in the modification require regulatory certification activity based on the modification;

determining at least one scope of work needed to complete regulatory certification for each of the entered and included other components;

wherein determining the other components, identifying which of the entered components and the included other components that require regulatory certification, and determining at least one scope of work further comprises:

answering questions to prompt a user to consider at least one comprehensive relationship between the entered components and the included other components; and generating an estimate of man-hours and costs needed to complete regulatory certification based on all of the determined scopes of work.

20. The computer-readable storage medium of claim 19, wherein each scope of work comprises one or more methods to be performed in order to satisfy one or more government regulations associated with the component, and wherein the estimate includes estimated man-hours and costs for performing the one or more methods of compliance.

21. The computer-readable storage medium of claim 20, wherein the one or more methods comprises at least one of testing, demonstrating, simulating, analyzing, or inspecting.

22. The computer-readable storage medium of claim 20, wherein the government regulations are one of federal aviation regulation or joint aviation requirement.

23. The computer-readable storage medium of claim 19, wherein the component configured to allow a user to determine comprises a component configured to supply queries to a user, wherein the queries relate to applicability of an associated component.

24. The computer-readable storage medium of claim 23, wherein the queries are at least one of a physical, spatial, functional, or safety query.

25. The computer-readable storage medium of claim 19, wherein the system is an aircraft, wherein the component configured to receive an entry comprises a component configured to receive an entry of aircraft model type effected by the modification, and wherein the component configured to identify is further configured to identify based on the entered aircraft model type.

26. The computer-readable storage medium of claim 19, further comprising a component configured to identify any certification deliverables based on the determined applicable components and associated scopes of work.

27. The computer-readable storage medium of claim 26, wherein the component configured to identify any certification deliverables further comprises a component configured to identify government forms associated with the identified deliverables.

28. An estimating system for estimating man-hours and costs to complete regulatory certification of a modification to a system, the estimating system comprising:

a database configured to store an estimating application program and related information;

a server coupled to the database, the server comprising a processor configured to generate a interface tool by executing the stored estimating application program; and one or more computer-based user devices in communication with the server over a network connection, the one or more computer-based user devices comprising:

a user interface device configured to present the interface tool, and allow a user to enter one or more components of the system involved in the modification;

wherein the estimating application program comprises:

means for automatically identifying other components of the system that may be involved in the modification based on the entered one or more components and related information stored in the database;

means for determining which of the automatically identified other components of the system to include in the modification;

means for identifying which of the entered components and the included other components involved in the modification require regulatory certification activity based on the modification;

means for determining at least one scope of work needed to complete regulatory certification for each of the entered and included other components;

wherein the means for determining the other components to include in the modification, the means for identifying which of the entered components and the included other components that require regulatory certification, and the means for determining at least one scope of work further comprises:

means for answering questions to prompt a user to consider at least one comprehensive relationship between the entered components and the other components; and means for generating an estimate of man-hours and costs needed to complete regulatory certification based the determined scopes of work.

29. The estimating system of claim 28, wherein each scope of work comprises one or more methods to be performed in order to satisfy one or more government regulations associated with the component, and wherein the estimate includes estimated man-hours and costs for performing the one or more methods of compliance.

30. The estimating system of claim 29, wherein the one or more methods comprises at least one of testing, demonstrating, simulating, analyzing, or inspecting.

31. The estimating system of claim 29, wherein the government regulations are one of a federal aviation regulation or a joint aviation requirement.

32. The estimating system of claim 28, wherein interface tool comprises queries, wherein the queries relate to applicability of an associated component.

33. The estimating system of claim 32, wherein the queries are at least one of a physical, spatial, functional, or safety query.

34. The estimating system of claim 28, wherein the system is an aircraft, wherein the interface tool comprises a means for entering aircraft model type effected by the modification, and wherein the means for identifying identifies further based on the entered aircraft model type.

35. The estimating system of claim 28, wherein the estimating application program further comprises a means for identifying certification deliverables based on the determined applicable components and associated scopes of work.

36. The estimating system of claim 35, wherein the means for identifying any certification deliverables further identifies government forms associated with the identified deliverables.

37. The estimating system of claim 35, wherein the related information stored in the database comprises information regarding how changes to components affect certification requirements to other components, regulatory information, and information regarding methods of work required to meet certification requirements.

* * * * *